Dec. 8, 1931. A. H. IHSEN 1,835,651
TUBE CUTTER
Filed Aug. 13, 1930
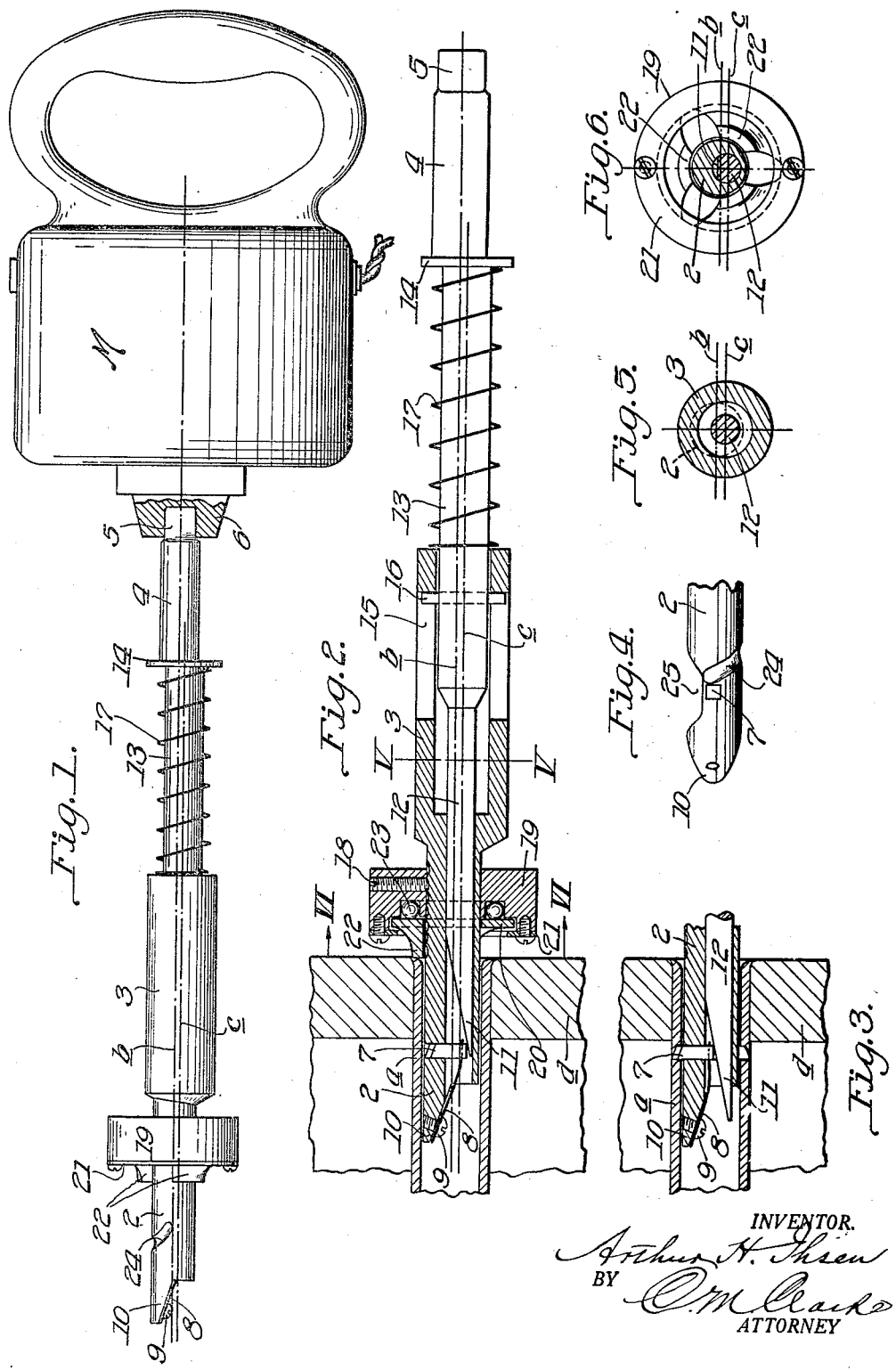
INVENTOR.
Arthur H. Ihsen
BY O. M. Clark
ATTORNEY Patented Dec. 8, 1931

1,835,651

UNITED STATES PATENT OFFICE

ARTHUR H. IHSEN, OF PITTSBURGH, PENNSYLVANIA

TUBE CUTTER

Application filed August 13, 1930. Serial No. 474,926.

My invention consists of an improvement in tube cutters for the purpose of cutting the tubes of boilers, heat exchangers, oil distillers, or the like, by application of the cutting tool to the interior of the tube. Ordinarily, in devices of the kind involved the tubes, as of some boilers, etc., are comparatively small in diameter and assembled in closely adjacent groups, rendering it impossible to apply a cutting tool to the exterior.

In my present invention I provide means for introducing the spindle of the tool into either open end of the tube for application of the cutter just beyond the end wall of the boiler, for severance, the severed portions of the tube then being easily removed endwise. Due to the contracted cross area of the tubes, and the necessity of advancing the cutter laterally as the spindle is rotated within the tube, it is necessary not only to apply rotating action to the spindle but also to provide gradually active means for extending the cutter as it is rotated, and for providing an ample bearing for the cutter in the restricted space, and to provide for removal of the cuttings.

In my improved device these conditions are very efficiently provided for by the construction more fully hereinafter described, showing one preferred embodiment of the invention.

Referring to the drawings:

Fig. 1 is a view in side elevation, showing the tube cutter in operative relation to a driving motor;

Fig. 2 is a longitudinal sectional view showing the device in operative position within the end of a boiler tube;

Fig. 3 is a partial similar view showing the position of the cutter at the finish of the cutting operation;

Fig. 4 is a detail plan view of the operative end of the cutter spindle;

Fig. 5 is a cross section on the line V—V of Fig. 2;

Fig. 6 is a similar section on the line VI—VI of Fig. 2.

Referring to the drawings, 2 is the rotatable spindle of the tool forming an integral extension of the barrel-shaped body 3 in rotative driving connection with the motor-actuated spindle 4. Spindle 4 is in socket connection, as by its squared terminal 5, with the chuck 6 of an electric or other suitable motor M, of well known construction.

Spindle 2 is of an outside diameter to fit freely within the interior of the tube $a$ and to be rotated therein by action of the motor, and to effect cutting through the wall of the tube by the cutter 7. Such cutter is mounted in the thick side wall of the spindle, reinforced as hereinafter described, and is normally retracted by action of a leaf spring 8 secured by screw 9 to the inside of the tip 10 of the spindle.

The cutter is gradually extended by means of the wedge terminal 11 which forms an inner extension by shank 12 of spindle 4, as such spindle is gradually pressed inwardly during its rotation by the motor.

For the purpose of providing ample bearing stock at the side of the spindle 2, through which the tool 7 extends, the bore hole for the wedge extension 12 is eccentrically off-set from the actual center $b$ of spindle 2, or on a different eccentrically located center $c$, as clearly indicated in Figs. 1 and 5.

Extension 12 is reinforced in diameter as at 13, and extends on center $c$ to a collar 14, beyond which the spindle 4 extends, but on the eccentrically off-set center $b$, corresponding to the concentric center of spindle 2.

By such construction I provide for direct application of rotative power from the motor chuck to the working end of the tool, while at the same time providing for the intervening lateral or eccentric location of the rotating tool distending wedge mechanism.

Barrel 3 of the device is provided with an elongated slot 15 at one or both sides, engaging a cross pin 16 of reinforced section 13 of the spindle, while a coiled spring 17 is interposed between the outer end of barrel 3 and collar 14. Such spring thus provides a buffing cushion tending to regulate or modify inward pressure. It also provides for retracting of the wedge upon cessation of inward pressure.

Fixedly mounted on spindle 2, as by a set screw 18 engaging one of a series of longitudinally arranged sockets in the spindle, is a collar 19, having a loosely mounted collar extension 20.

Such collar is mounted between the inner recessed annular face of disk 19 and an outer retaining ring 21, by its terminal flange, and is provided with a plurality of forwardly extending bearing fingers 22, adapted to engage against the end of the tube a, or against the head d, as in Fig. 2.

Between the rear face of the flange of collar 20 and the inner annular bearing face of collar 19 is interposed an annular series of bearing balls or rollers 23, or equivalent device, for reducing friction to a minimum.

Spindle 2 is provided with a groove 24, leading away from the cutter 7 spirally around the spindle and backwardly from the cutter, for clearance and escape of cuttings. The spindle is also cut away at the advancing side of the cutter, as at 25, providing ample space for any accumulation of cuttings.

As thus constructed the cutter is mounted transversely of the reinforced or thickest side of the wall of the hollow spindle 2 so as to give it ample bearing therein for inward and outward movement, during the cutting operation.

Upon being introduced within one end of the tube to be cut, the location of the cutter being regulated by adjustment of collar 19 according to the thickness of the boiler head d, application of power from motor M will rotate spindle 4 and its eccentrically off-set extensions 13—12, imparting corresponding rotation to barrel 3 and spindle 2 by pins 16.

Thereupon, inward pressure being exerted by the operator gradually against resistance of spring 17, the wedge extension 11 will be advanced, gradually throwing the cutter 7 outwardly into contact with and through the inner wall of the tube, such operation being continued until the tool has been advanced for the full thickness of the tool for severance, as in Fig. 3.

The inwardly extending fingers 22 during such operation bear directly against the end of the tube or the head d and form a stationary bearing for rotative action of collar 19 against the intervening bearings 23.

The construction and operation of the device will be readily understood and appreciated from the foregoing description by all those familiar with the operation of cutting boiler tubes or the like. It is comparatively simple, cheap in construction, reliable and effective in operation, and rapidly and cleanly severs the tube without undue waste.

The dimensions, degree of wedge surface, proportions, size, etc. of the cutter may be varied, or it may be otherwise changed in detail construction by the skilled mechanic, but all such changes are to be understood as within the scope of the following claims.

What I claim is:

1. In a tube cutter, the combination of a cylindrical cutter spindle having an eccentrically located bore providing a relatively thick wall for the spindle at one side and having an extended tip, a transverse cutter opening, a cut-away clearance opening adjacent the cutter opening, and a spiral clearance groove leading away from the cutter opening; a laterally movable cutter in the cutter opening, a spring secured to the tip of the spindle having slotted connection with the cutter, and a longitudinally movable member in the cutter spindle bore in rotation imparting engagement therewith having a wedge terminal engaging the cutter.

2. In a tube cutter, the combination of a cylindrical cutter spindle having an eccentrically located bore providing a relatively thick wall for the spindle at one side and having an extended tip, a transverse cutter opening, a cut-away clearance opening adjacent the cutter opening, and a spiral clearance groove leading away from the cutter opening; a laterally movable cutter in the cutter opening, a spring secured to the tip of the spindle having slotted connection with the cutter, a longitudinally movable member in the cutter spindle bore in rotation imparting engagement therewith having a wedge terminal engaging the cutter, a limiting collar secured on the cutter spindle having a loosely mounted thrust bearing provided with a plurality of projections and a rear annular face, and rolling bearings between said face and the collar.

3. In a tube cutter, the combination of a cylindrical cutter spindle having an eccentrically located bore providing a relatively thick wall for the spindle at one side and having an extended tip, a transverse cutter opening, a cut-away clearance opening adjacent the cutter opening, a spiral clearance groove leading away from the cutter opening, and an extended longitudinally slotted barrel portion; a laterally movable cutter in the cutter opening, a spring secured to the tip of the spindle having slotted connection with the cutter, a longitudinally movable stem having a transverse pin engaging the slotted barrel and an outermost turning terminal, a spring between the terminal and the barrel, and an inner extension of said stem extending through the bore of the spindle and provided with a wedge terminal engaging the cutter.

4. In a tube cutter, the combination of a cylindrical cutter spindle having an eccentrically located bore providing a relatively thick wall for the spindle at one side and having an extended tip, a transverse cutter opening, a cut-away clearance opening adjacent the cutter opening, a spiral clearance groove leading away from the cutter opening, and an extended longitudinally slotted barrel portion; a laterally movable cutter in the cutter opening, a spring secured to the tip of the spindle having slotted connection with the cutter, a longitudinally movable stem having a transverse pin engaging the slotted barrel and an outermost turning terminal, a spring between the terminal and the barrel, an inner extension of said stem extending through the bore of the spindle and provided with a wedge terminal engaging the cutter, a limiting collar secured on the cutter spindle having a loosely mounted thrust bearing provided with a plurality of projections and a rear annular face, and rolling bearings between said face and the collar.

In testimony whereof I hereunto affix my signature.

ARTHUR H. IHSEN.